United States Patent [19]

Hashimoto et al.

[11] Patent Number: 4,572,131

[45] Date of Patent: Feb. 25, 1986

[54] GOVERNOR DEVICE OF DIESEL ENGINE

[75] Inventors: Haruo Hashimoto, Kamakura; Toyoichi Ono, Isehara, both of Japan

[73] Assignee: Kabushiki Kaisha Komatsu Seisakusho, Tokyo, Japan

[21] Appl. No.: 617,627

[22] Filed: Jun. 6, 1984

[30] Foreign Application Priority Data

Jun. 13, 1983 [JP] Japan ................................ 58-105523

[51] Int. Cl.⁴ .................................................. F02D 5/00
[52] U.S. Cl. ..................................... 123/357; 73/119 A
[58] Field of Search ................................ 123/357–359, 123/363–374; 192/84 R, 84 A, 84 AA, 84 AB, 84 B, 84 C, 84 PM, 84 T; 73/119 A

[56] References Cited

U.S. PATENT DOCUMENTS

| 3,973,538 | 8/1976 | Williams et al. ............... | 123/357 |
| 4,192,398 | 3/1980 | Hunt ............................... | 123/357 |
| 4,219,000 | 8/1980 | Locher et al. ................. | 123/357 |
| 4,417,554 | 11/1983 | Dinger ........................... | 123/357 |
| 4,457,390 | 7/1984 | Abe et al. ..................... | 180/142 |

FOREIGN PATENT DOCUMENTS

| 14233 | 2/1978 | Japan ............................. | 123/357 |
| 36921 | 3/1980 | Japan . | |

Primary Examiner—Magdalen Y. C. Moy
Attorney, Agent, or Firm—Spensley, Horn, Jubas & Lubitz

[57] ABSTRACT

The governor device includes an electromagnetic clutch capable of utilizing the driving force of a diesel engine for driving a control rack of fuel injection pumps. The electromagnetic clutch is controlled based on the difference between a preset engine speed and an actual speed. With this device, electrically controlled governor operation can be executed without use of an electric actuator such as a solenoid or the like.

9 Claims, 7 Drawing Figures

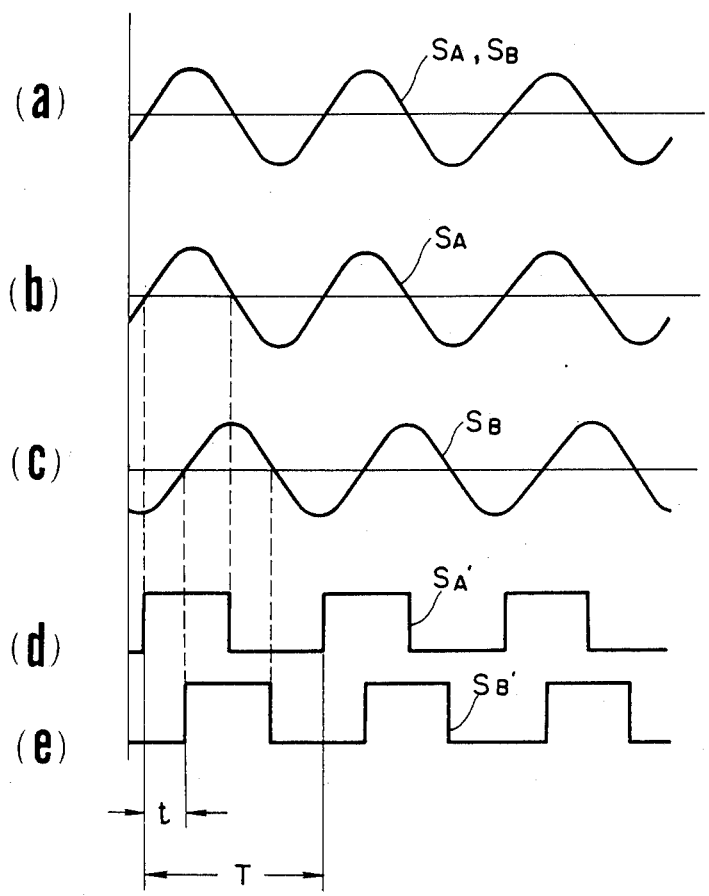

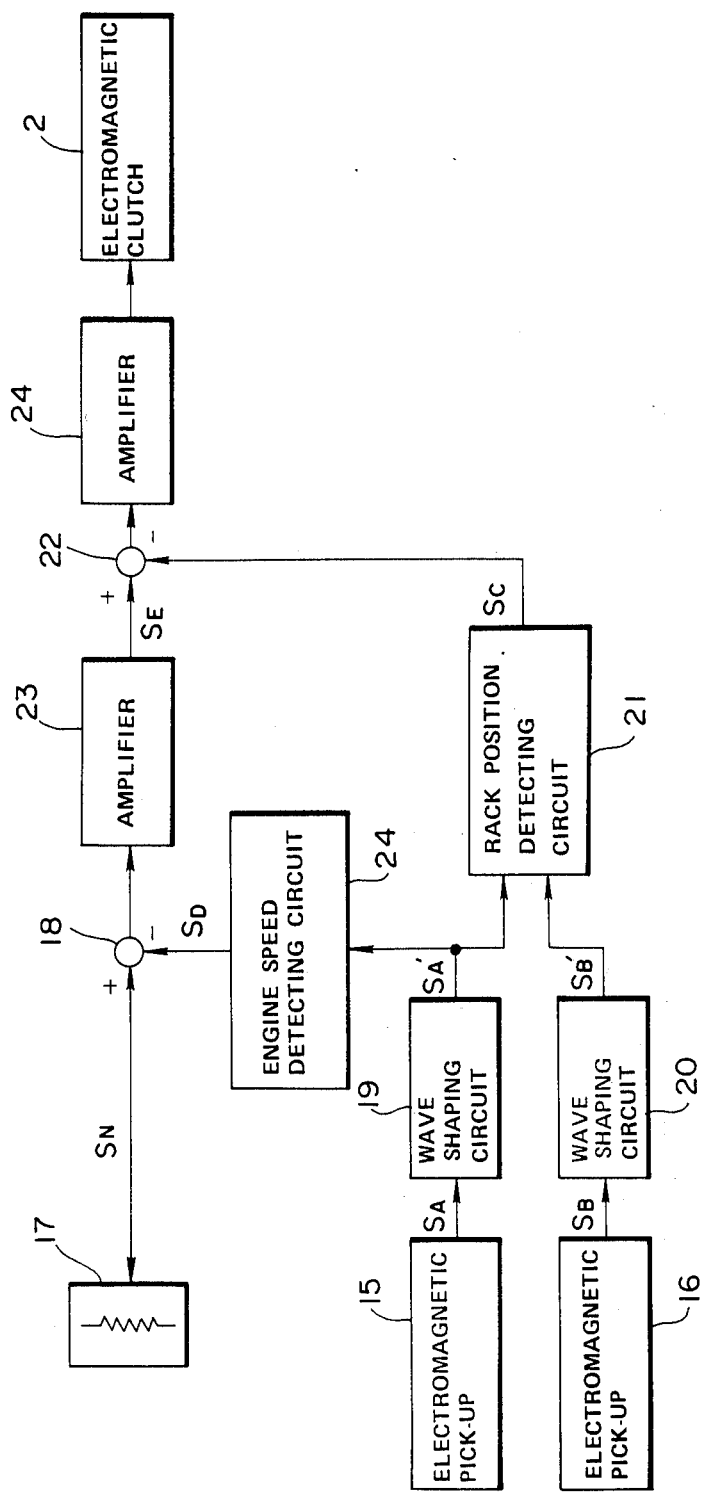

GOVERNOR DEVICE OF DIESEL ENGINE

BACKGROUND OF THE INVENTION

1. Field of the Invention

This invention relates to governor devices for diesel engines, and more particularly to a type thereof which is controlled electrically.

2. Description of the Prior Art

Heretofore mechanical type and electrical type of governor devices have been used for controlling diesel engines. The mechanical type governor device has been found to be advantageous because it requires no separate power source. However, since a spring force is utilized for setting the engine torque, the precision of the setting is not sufficiently high and the maintenance and inspection of the governor device are made extremely troublesome because of the complication of the mechanism. On the other hand, the electrical type governor device has been found to be advantageous because of the simple construction and high precision. However, it includes an electric actuator such as a solenoid for operating a control rack, thus requiring a comparatively heavy current, increasing the power consumption.

SUMMARY OF THE INVENTION

An object of the present invention is to provide a governor device for a diesel engine wherein the advantageous features of the two types of the conventional governor devices are maintained whereas the difficulties of the conventional governor devices can be substantially eliminated.

Another object of the invention is to provide a governor device for a diesel engine wherein the driving force of the diesel engine is utilized for reducing the power consumption while the advantageous features of the electrical type governor device are retained.

The above described and other objects of the invention can be achieved by a governor device for a diesel engine comprising an electromagnetic clutch which utilizes the driving force of the diesel engine for controlling fuel injection pumps of the diesel engine and means for controlling the electromagnetic clutch, which in turn comprises means for setting a desired value of the engine speed for delivering a commanding signal, means for detecting actual engine speed, and a driving circuit which controls the exciting current of the electromagnetic clutch based on the difference between the output signal of the setting means and the output signal from the engine speed detecting means.

BRIEF DESCRIPTION OF THE DRAWINGS

In the accompanying drawings:

FIG. 5 which includes (a) through (e) constitutes a timing chart illustrating phase relations of the output signals of the pick-ups and the shaped signals of the output signals corresponding to a variation in the position of a rack;

FIG. 7 is a block diagram of an electric circuit used for controlling the operation of the electromagnetic clutch.

DESCRIPTION OF THE PREFERRED EMBODIMENT

Figure 1:
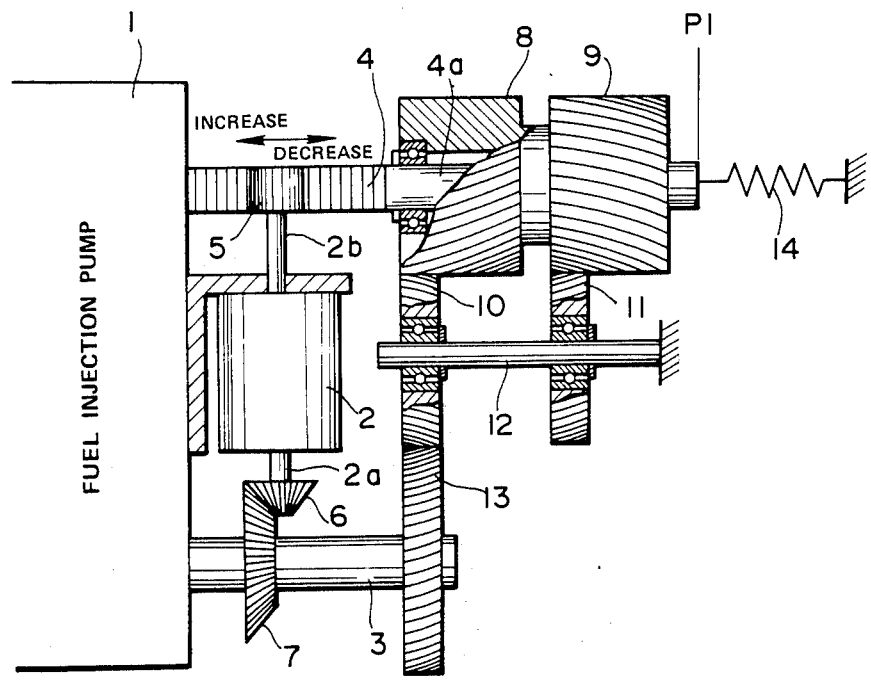
FIG. 1 is a diagram showing a mechanical part of a preferred embodiment of the present invention.

The preferred embodiment of the present invention shown in FIG. 1 comprises an electromagnetic clutch 2 secured to one side of a fuel injecting pump device 1 and a control rack 4 having an end connected to the fuel injecting pump device 1 for controlling the same. The electromagnetic clutch 2 transmits the torque of a cam shaft 3 of the diesel engine to a pinion 5 engaging with the control rack 4. More specifically, a bevel gear 6 provided on an input shaft 2a of the electromagnetic clutch 2 meshes with a bevel gear 7 fixedly mounted on the cam shaft 3, while the pinion 5 provided on an output shaft 2b of the electromagnetic clutch 2 meshes with the control rack 4.

Another end of the control rack 4 away from the pump device 1 is extended to be formed into a shaft 4a on which are rotatably mounted a pair of helical gears 8 and 9 rigidly coupled with each other. Another pair of helical gears 10 and 11 meshing with the helical gears 8 and 9 are rotatably mounted on a fixed shaft 12. The helical gear 10 further meshes with a helical gear 13 fixedly mounted on the cam shaft 3.

The gears 8 and 9 are formed with an equal number of helical teeth of opposite orientations. The helical gears 10 and 11 meshing with the gears 8 and 9, respectively, are also formed with the same number of helical teeth of the opposite orientations. Axial displacement of the helical gears 8 and 9, and also of the helical gears 10 and 11 relative to the shafts 4a and 12 is inhibited.

A tension spring 14 provided at an end of the shaft 4a urges the shaft 4a and the rack 4 rightwardly as viewed in FIG. 1 so that the amount of fuel injected by the pump device 1 is thereby reduced. In a state where the electromagnetic clutch 2 is not excited, the control rack 4 and the shaft 4a is displaced by the tension of the tension spring 14 so that the end of the shaft 4a is brought into a position P1 as shown in FIG. 1.

Figure 2:
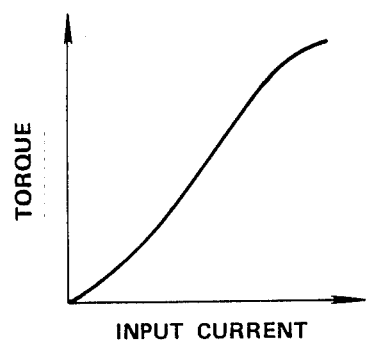
FIGS. 2 and 3 are graphs showing operational characteristics of a hysteresis type electromagnetic clutch used in the embodiment shown in FIG. 1.
Figure 3:
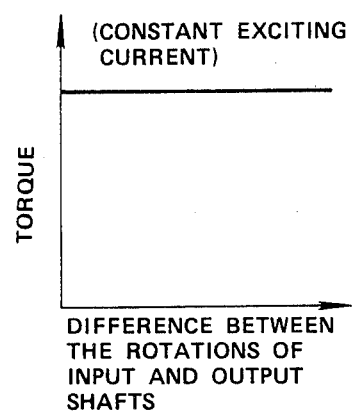

The electromagnetic clutch 2 in this embodiment is of a noncontacting type having an air gap, in which the transmission of torque is effected by an electromagnetic force. Since the clutch 2 of this type involves no mechanically contacting members as in the case of a clutch having clutch plates and the like a long operational life of the clutch 2 is ensured. FIG. 2 shows an operational characteristics, in which the output torque of the clutch 2 increases substantially in proportion to the exciting current, while in the characteristics shown in FIG. 3, when the exciting current is held constant, the torque is maintained at a substantially constant value regardless of the difference between the rotating speeds of the input and the output shafts 2a and 2b.

Figure 4:
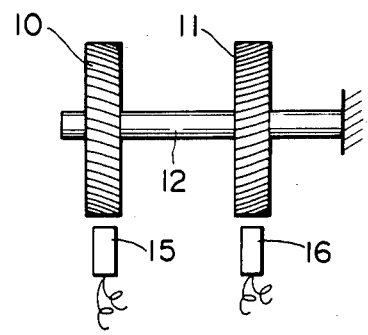
FIG. 4 is a diagram showing the arrangement of electromagnetic pick-ups.

FIG. 4 illustrates electromagnetic pick-ups 15 and 16 provided in opposition to the helical gears 10 and 11. These pick-ups detect variations in reluctances caused by the projections and recesses of the gear teeth, and deliver electric signals $S_A$ and $S_B$ of sinusoidal waveforms as shown in FIG. 5(a).

Figure 6:
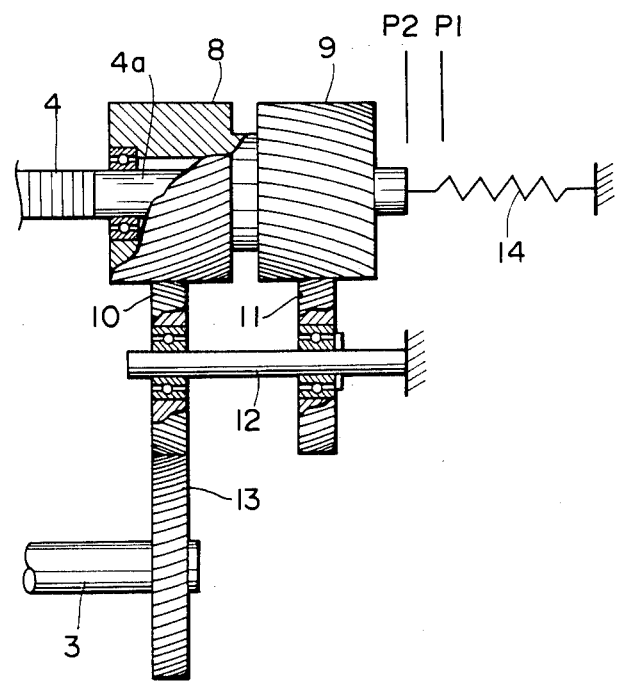
FIG. 6 is a diagram showing an operating state of the control rack used in the embodiment.

When the control rack 4 is moved by the pinion 5 leftwardly as viewed in FIG. 1 to a position P2 shown in FIG. 6, the gears 8 and 9 rigidly coupled with each other are moved leftwardly together with the control rack 4. In this movement, the gear 8 is rotated for an angle corresponding to the moved distance of the rack 4, and therefore the gear 9 is also rotated for the same angle. Such an operation can be understood easily by considering a case where the rack 4 is forcibly shifted leftward while the gear 10 is maintained in the locked state. Upon rotation of the gear 9 for an angle corresponding to the leftward shift of the control rack 4, the gear 11 is also rotated for the same angle, causing a phase shift between the output signals $S_A$ and $S_B$ as shown in FIGS. 5(b) and 5(c). The phase shift is utilized as a parameter that represents the moved distance of the control rack 4 as hereinlater described in more detail.

When the rack 4 moves leftward as described above, injected amount of fuel increases, thereby increasing the rotating speed of the diesel engine. As a consequence, the frequency of the signals $S_A$ and $S_B$ shown in FIGS. 5(b) and 5(c) becomes higher than that of the signals shown in FIG. 5(a). In the drawing, such variation of frequency is neglected because of the simplicity of the drawing.

In FIG. 7 showing an electric circuit for controlling the operation of the electromagnetic clutch 2, a desired rotating speed N is set in a rotating speed setting device 17. The device 17 thus delivers a command signal $S_N$ corresponding to the set voltage to an adder 18. The output signals $S_A$ and $S_B$ delivered from the electromagnetic pick-ups 15 and 16 are on the other hand applied to wave shaping circuits 19 and 20 wherein the signals $S_A$ and $S_B$ of sinusoidal waveforms are shaped into rectangular waveform signals $S_A'$ and $S_B'$ as shown in FIGS. 5(d) and 5(e). The signals $S_A'$ and $S_B'$ are then applied to a rack position detecting circuit 21. The rack position detecting circuit 21 detects the time interval t between the rising instants of the rectangular signals $S_A'$ and $S_B'$, and also the one-cycle period T of the two signals $S_A'$ and $S_B'$. The rack position detecting circuit 21 further calculates the ratio t/T, and delivers an electric signal $S_c$ corresponding to the ratio t/T.

Although the time interval t implies the phase difference between the two signals $S_A$ and $S_B$, only the time interval t cannot determine the displacement of the control rack 4. The variation of the engine speed in turn varies the frequency of the signals $S_A$ and $S_B$ as well as the time interval t. For instance a leftward displacement of the control rack 4 increases the phase difference of the signals $S_A$ and $S_B$. However, since the frequency of the two signals $S_A$ and $S_B$ is also increased, the time interval t is reversely shortened. For this reason, only the time interval t cannot define the absolute value of the phase difference indicative of the displacement of the control rack 4. However, since the period T is also varied according to the time interval t at an equal rate, the calculation of the ratio t/T permits to obtain the absolute phase difference between the signals $S_A'$ and $S_B'$ which define the displacement of the control rack 4. The signal $S_c$ delivered from the rack position detecting circuit 21 and corresponding to the ratio t/T is then applied to an adder 22.

In the above described embodiment, the position P1 shown in FIG. 1 is selected to be the initiation point of the control rack movement, and the pick-ups 15 and 16 are adjusted such that the phase difference between the two signals $S_A$ and $S_B$ becomes zero when the control rack 4 is placed at this initiation point P1. The rack position detecting circuit 21 may be easily constructed out of conventional circuit elements such as flip-flops, counters, dividers and the like. Furthermore, the engine speed detecting circuit 24 may be so constructed that it is operable as a frequency-voltage converter that converts the signal $S_A'$ having a frequency corresponding to the rotating speed of the engine into a signal $S_D$ representing the engine speed.

The embodiment of the invention operates as follows. When the engine speed is varied according to the variation of the load torque, the difference between the signal $S_D$ indicative of the actual engine speed and the commanding signal $S_N$ increases. The difference is amplified by an amplifier 23, and the output of the amplifier 23 is applied as a position commanding signal $S_E$ for the control rack 4 to the adder 22. The adder 22 compares the position command signal $S_E$ with the feedback signal $S_C$ that represents the present position of the control rack 4, and the difference amplified by an amplifier 24 is applied to the electromagnetic clutch 2. Thus the exciting current of the electromagnetic clutch 2 is varied, and the control rack 4 is displaced to a position where the actual engine speed is made equal to the set value N.

When it is desired to operate the governor in consideration of the temperature, lubricating condition and else of the engine, circuit means may be interposed between the setting device 17 and the adder 18 for varying the command signal $S_N$ according to the outputs of sensors provided for sensing these conditions.

Although in the above described embodiment, the displacement of the control rack 4 has been detected from the output signals $S_A$ and $S_B$ of the electromagnetic pick-ups 15 and 16, it is of course possible to detect the displacement by use of a displacement-voltage converter such as a potentiometer and the like. Furthermore, the pinion and rack combination provided on the output side of the electromagnetic clutch 2 may be replaced by a combination of cam and lever. Likewise, the gears 9 and 11 may otherwise be replaced by spur gears.

What is claimed is:

1. A governor device for a diesel engine comprising:
   an electromagnetic clutch which shifts a control rack of fuel injection pumps of the diesel engine by use of driving force of the same engine; and
   means for controlling said electromagnetic clutch, which in turn comprises:
   means for setting a desired value of engine speed for delivering a command signal;
   means for detecting actual engine speed; and
   a driving circuit for controlling exciting current of said electromagnetic clutch based on a difference between an output signal of said engine speed setting means and an output signal of said engine speed detecting means, and wherein;
   said electromagnetic clutch has an input shaft coupled through gears to a cam shaft for driving said fuel injection pumps, and an output shaft coupled with a pinion meshing with said control rack.

2. A governor device for a diesel engine comprising:
   an electromagnetic clutch which shifts a control rack of fuel injection pumps of the diesel engine by use of driving force of the same engine; and
   means for controlling said electromagnetic clutch, which in turn comprises:
   means for setting a desired value of engine speed for delivering a command signal;
   means for detecting actual engine speed; and
   a driving circuit for controlling exciting current of said electromagnetic clutch based on a difference between an output signal of said engine speed setting means and an output signal of said engine speed detecting means, and wherein;

said means for controlling said electromagnetic clutch further comprises means for detecting the position of said control rack and means for adding the output of said rack position detecting means as a feed-back value to said difference, and wherein;

said rack position detecting means comprises a shaft extending axially from an end of said control rack, integrally coupled first and second helical gears having equal number of teeth and rotatably mounted on said shaft while the axial movement of said gears is prohibited, integrally coupled third and fourth helical gears meshing with said first and second helical gears while the axial movement of the third and fourth gears is prohibited, first and second electromagnetic pick-ups provided in opposition to the threaded parts of said third and fourth helical gears, and a rack position detecting circuit which detects a time interval t representing a phase shift between the output signals of said first and second electromagnetic pick-ups and also one cycle period of the output signals, and calculates a ratio t/T, and wherein the driving force of the diesel engine is applied to either one of said second and third helical gears.

3. A governor device as set forth in claim 2 wherein said engine speed detecting means receives either one of the output signals of said first and second electromagnetic pick-ups and converts the frequency of said output signal to a corresponding voltage.

4. A governor device for an engine comprising:
an electromagnetic clutch which selectively couples the mechanical driving force of the engine to a control rack of a fuel injection pump of the engine, said coupling causing said control rack to be laterally shifted and the rate of fuel injection thereby altered,
means for actuating said electromagnetic clutch, comprising:
means for setting a desired value of engine speed;
means for detecting actual engine speed;
means for detecting the position of said control rack;
a first circuit means for producing a rack position commanding signal for the electromagnetic clutch based on the difference between an output signal of said engine speed setting means and an output signal of said engine speed detecting means; and
a second circuit means for controlling the excitation current of said electromagnetic clutch based on a difference between aid rack position commanding signal and an output of said rack position detecting means wherein;
said control rack position detecting means comprises:
a first member rotatingly driven directly by a shaft of said engine;
a second member rotatingly driven by said engine shaft via a gear train adjusted by the position of said rack;
first and second rotation sensors associated respectively with said first and second rotating members; and
circuit means for providing a signal indicative of the ratio between the phase difference between the outputs of said first and second sensors and the repetition rate of the output of said first rotation sensor, said indicative signal being said output of said rack position detecting means.

5. A means for detecting the position of a control rack for a fuel injection pump of an engine, comprising a shaft extending axially from an end of said control rack, integrally coupled first and second helical gears having equal numbers of teeth and rotatably mounted on said shaft, integrally coupled third and fourth helical gears meshing with said first and second helical gears, first and second electromagnetic pick-ups provided in opposition to the threaded parts of said third and fourth helical gears, and a rack position detecting circuit which detects a time interval t representing a phase shift between the output signals of said first and second electromagnetic pick-ups and also detects one cycle period T of the output signals, and calculates a ratio t/T which represents the displacement of the control rack from an origin position.

6. The means for detecting as set forth in claim 5 wherein an engine speed detecting means receives either one of the output signals of said first and second electromagnetic pick-ups and converts the frequency of said output signal to a corresponding voltage.

7. The means for detecting of claim 5 wherein the mecnanical driving force of the engine rotates said first and second helical gears.

8. A governor device for a diesel engine comprising:
an electromagnetic clutch which shifts a control rack of a fuel injection pump of the diesel engine by use of the driving force of the same engine, said electromagnetic clutch having an input shaft coupled through gears to a cam shaft for driving said fuel injection pump, and an output shaft coupled with a pinion meshing with said control rack; and
means for controlling said electromagnetic clutch, which in turn comprises:
means for setting a desired value of engine speed for delivering a command signal;
means for detecting actual engine speed; and
a driving circuit for controlling exciting current of said electromagnetic clutch based on a difference between an output signal of said engine speed setting means and an output signal of said engine speed detecting means.

9. A governor device for an engine wherein the rate of fuel injection is controlled, comprising:
means for detecting the difference between a desired engine speed and the actual engine speed;
means for comparing said difference with the position of a fuel injection control rack for a fuel injection pump, said rack position controlling the rate of fuel injection, said position monitored by a shaft extending axially from an end of said control rack, integrally coupled first and second helical gears having equal numbers of teeth and rotatably mounted on said shaft, integrally coupled third and fourth helical gears meshing with said first and second helical gears, first and second electromagnetic pick-ups provided in opposition to the threaded parts of said third and fourth helical gears, and a rack position detecting circuit which detects a time interval t representing a phase shift between the output signals of said first and second electromagnetic pick-ups and also detects one cycle period T of the output signals, and calculates a ratio t/T which represents the displacement of the control rack from an origin position.

* * * * *